US005541464A

United States Patent [19]

Johnson et al.

[11] Patent Number: 5,541,464

[45] Date of Patent: Jul. 30, 1996

[54] THERMIONIC GENERATOR

[76] Inventors: Lonnie G. Johnson, 4030 Ridgehurst Dr., Smyrna, Ga. 30080; Francis E. LeVert, 1909 Matthew La., Knoxville, Tenn. 37923

[21] Appl. No.: 219,914

[22] Filed: Mar. 30, 1994

[51] Int. Cl.[6] ...... H02N 7/00

[52] U.S. Cl. ...... 310/306; 322/2 R

[58] Field of Search ...... 310/306; 322/2 R, 322/2 A

[56] References Cited

U.S. PATENT DOCUMENTS

| | | | |
|---|---|---|---|
| 3,265,910 | 8/1966 | Thomas | 310/4 |
| 3,279,028 | 10/1966 | Hall et al. | 310/306 |
| 3,322,978 | 5/1967 | Lary et al. | 310/306 |
| 3,702,408 | 11/1972 | Longsderff et al. | 310/4 |
| 3,719,532 | 3/1973 | Falkenberg et al. | 136/208 |
| 4,772,816 | 9/1988 | Spence | 310/306 |
| 4,927,599 | 5/1990 | Allen | 376/321 |

FOREIGN PATENT DOCUMENTS

| | | | |
|---|---|---|---|
| 878521 | 6/1953 | Germany | 310/306 |
| 106978 | 4/1967 | United Kingdom | 310/306 |

OTHER PUBLICATIONS

S. W. Angrist, "Direct Energy Conversion", Chpt. 6, Themionic Generator; May 1977; Boston, Mass.

*Primary Examiner*—R. Skudy
*Attorney, Agent, or Firm*—Kennedy & Kennedy

[57] ABSTRACT

A thermionic generator (10) has a heated metal heat tube (11) journaled through a set of star-shaped emitters (12) and a set of electrically insulative spacers (13). The generator also has a collector (23) positioned about the grouped emitters and spacers a selected distance from the emitters. A cooling jacket (33) is positioned about the collector for cooling the collector during operation. A pair of seals (29) electrically and hermetically seal the cooling jacket about the heat tube.

10 Claims, 2 Drawing Sheets

THERMIONIC GENERATOR

TECHNICAL FIELD

This invention relates to thermionic generators, and particularly to tubular thermionic generators of tubular configurations.

BACKGROUND OF THE INVENTION

Thermionic generators convert heat energy to electric power. Most thermionic generators have a planar emitter and a planar collector which are separated by ceramic spacers that also seal the space between the emitter and collector from ambience. The sealed space may be a near vacuum or a low pressure plasma. The emitters are typically made of a refractory metal having a low Fermi level while the collectors are made of a metal having a relatively high Fermi level.

When sufficient heat is supplied to the emitter, high energy free electrons obtain enough energy to escape from the emitter surface. This phenomenon is known as thermionic emission. The energy required to force these free electrons from the emitter is referred to as the surface work or work function. These basic physical principles are discussed in detail in *Direct Energy Conversion,* 3rd edition, by Stanley W. Angrist.

The passing of free electrons to the collector manifests a flow of electric current. However, the emission of electrons produces a space charge in the space between the emitter and the collector which severely limits the efficiency of the generator. To overcome this problem a low pressure plasma is maintained within the space to limit the space charge produced. Nevertheless, this type of generator still does not produce electric power efficiently. Additionally, thermal instabilities of the planar components often causes them to warp, thus making it difficult to maintain a proper spacing between the emitter and collector. An improper spacing causes inefficiencies and creates a risk of system failure. For example, if the emitter warps towards the collector it can contact the collector and thereby cause an electric short. Conversely, if the emitter warps away from the collector the spacing increases thereby resulting in a decrease in electron flow.

Thermionic generators have been designed that have electron discharge pins extending outwardly from the planar emitters which terminate very close to the collector, as shown in FIG. 1. The presence of these pins increases the efficiency by which the electrons flow from the emitter to the collector. However, here too thermal instabilities cause difficulties in maintaining a proper spacing between the ends of the pins and the collector.

Thermionic generators have also been designed having elongated tubular emitters telescopically positioned within elongated tubular collectors as shown in U.S. Pat. No. 3,265,910. This configuration decreases the overall size of the generator. Here again, however, these generators suffer from the effects of thermal instabilities which may cause the elongated emitter and collector to warp.

Accordingly, it is seen that a need remains for a more efficient and thermally stable thermionic generator. It is to the provision of such therefore that the present invention is primarily directed.

SUMMARY OF THE INVENTION

In a preferred form of the invention a thermionic generator comprises a tubular collector and an emitter mounted within the tubular collector which has a plurality of points with tips located closely adjacent the tubular collector. The generator also has heating means for heating the emitter sufficiently to produce thermionic emission at the point tips and means for coupling an electric load with the emitter and collector.

DETAILED DESCRIPTION

Figure 1:
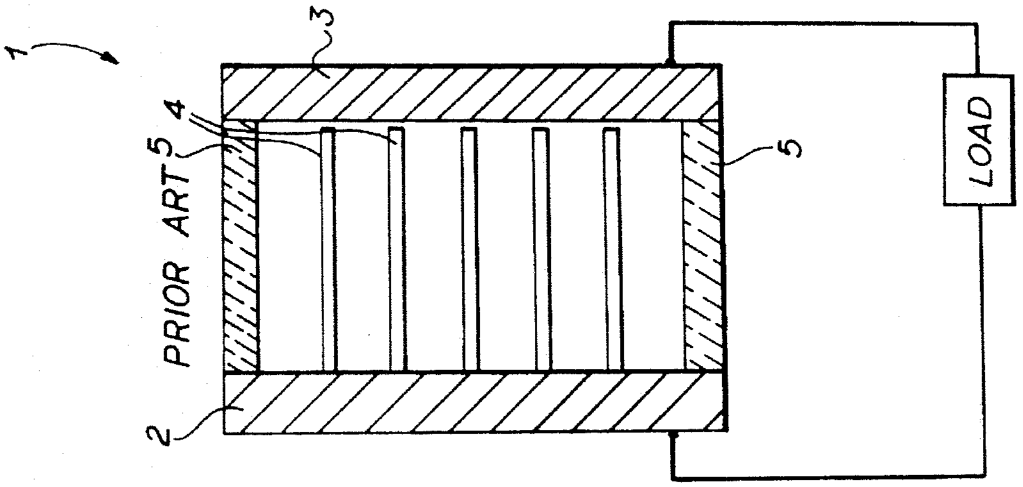
FIG. 1 is a side view of a conventional thermionic generator having planar emitter and collector plates and discharge pins extending from the emitter plate.

With reference to FIG. 1, there is shown a conventional thermionic generator 1 having a planar emitter 2 and a planar collector 3. The emitter 2 has five electron discharge pins 4 extending therefrom towards the collector 3. The emitter and collector are maintained in spaced relation from each other by ceramic spacers 5 which also seal off the space therebetween so it may be evacuated.

Figure 2:
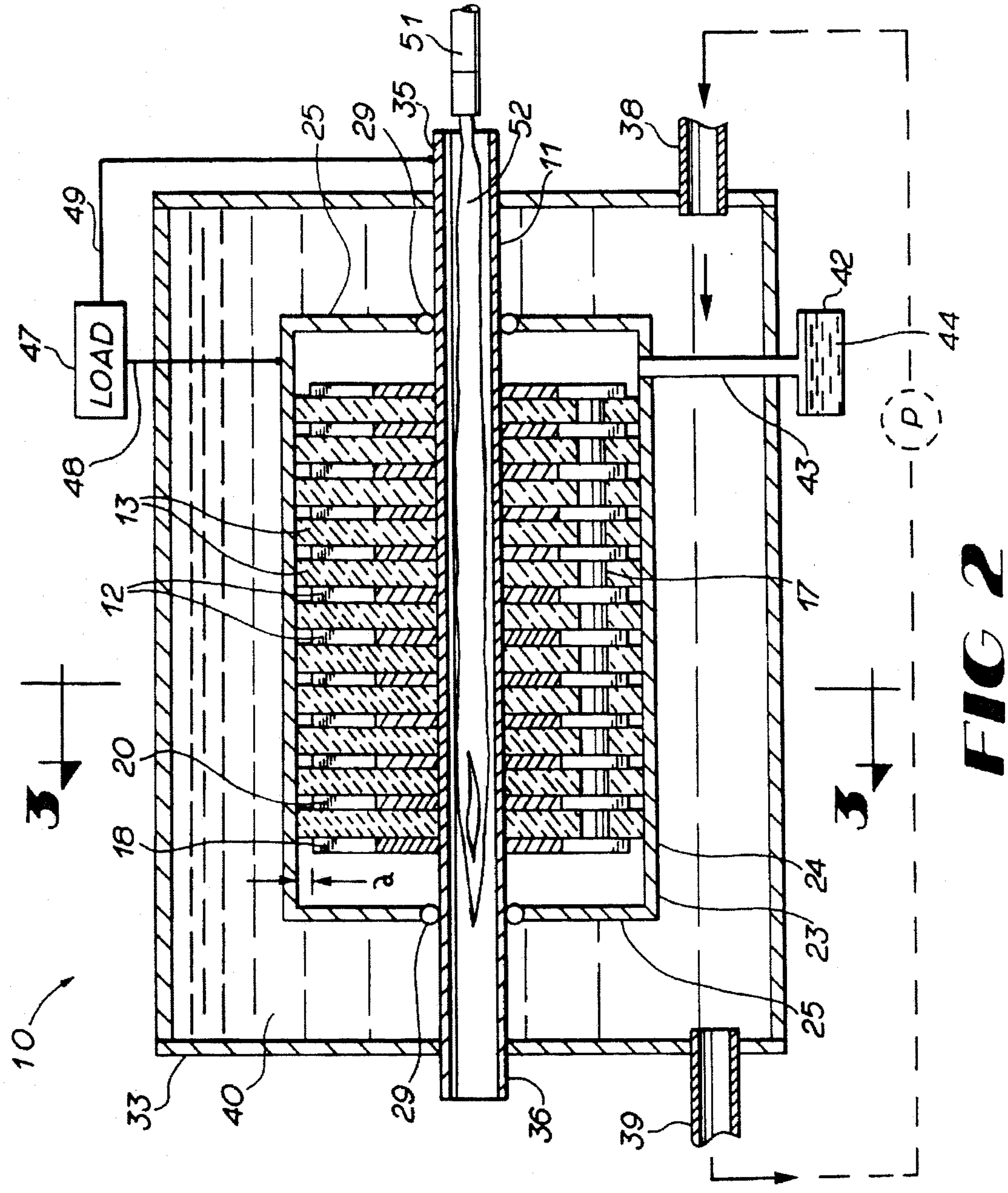
FIG. 2 is a cross-sectional view of a thermionic generator embodying principles of the invention in a preferred form.
Figure 4:
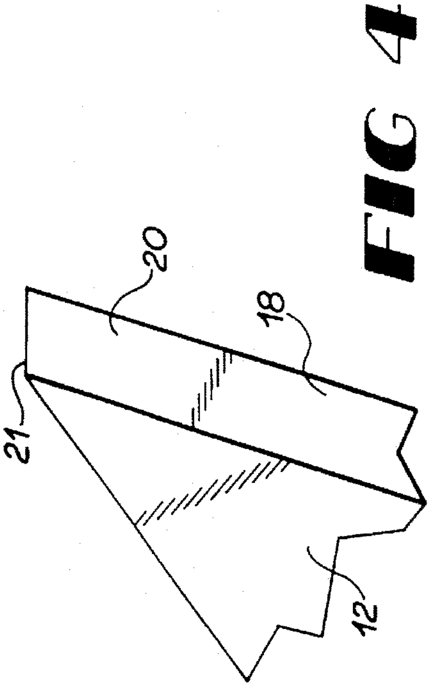
FIG. 4 is a perspective view of a fragment of an emitter point of the thermionic generator of FIG. 2.
Figure 3:
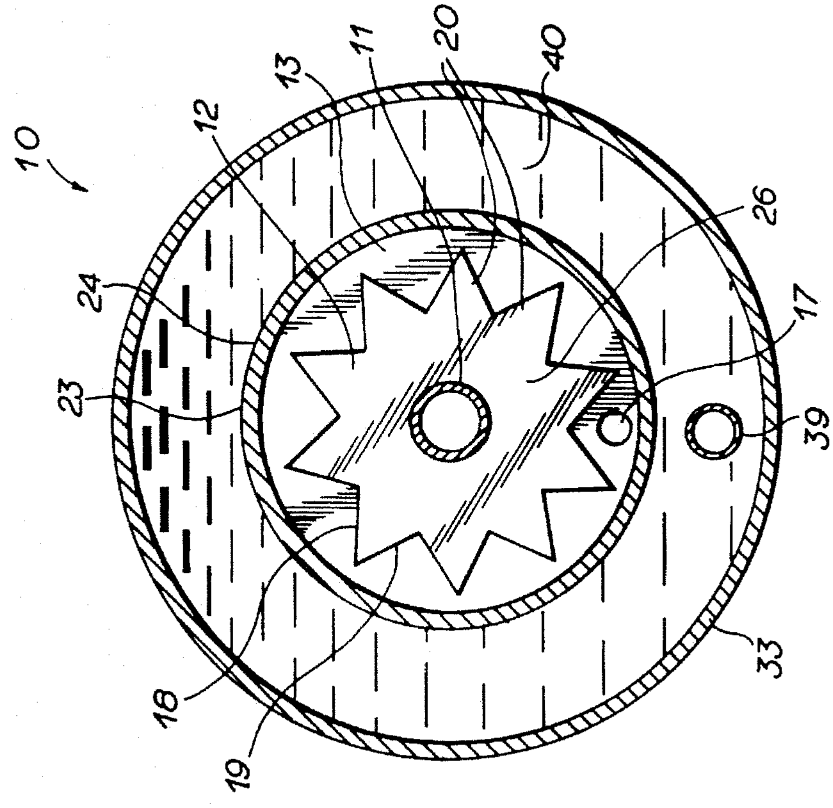
FIG. 3 is a cross-sectional view of the thermionic generator of FIG. 2 taken along plane 3—3.

With reference next to FIGS. 2–4 of the drawing, there is shown a new thermionic generator 10 having a central, electrically and thermally conductive, metal heat tube 11 made of a refractory metal such as tungsten. A set of generally star-shaped emitters or emitter plates 12, also made of tungsten, and a set of electrically insulative, annular spacers 13 made of a ceramic such as alumina are 10 press fitted about the heat tube 11. Each spacer 13 has a passage 17 therethrough. Each emitter 12 is star-shaped with ten points or spokes 20 from which ten pairs of side walls 18 and 19 diverge from a tip 21 of the point to the emitter hub portion 26. As best shown in FIG. 4, the point tip 21 is ridge shaped. Here the several emitter and spacers are mounted upon the heat tube in alternating sequence as a stack.

A tubular collector 23, preferably made of molybdenum, is mounted about the stack of emitters 12 and spacers 13. The collector 23 has a cylindrical side wall 24 and two annular end walls 25 that extend from the opposite ends of the side wall 24 through which the tube 11 extends. Heat resistant, ceramic seals 29 electrically insulate the collector 23 from the heat tube 11 and hermetically seal the interior of the collector. The inside diameter of the collector 23 is substantially equal to the outside diameter of the spacers 13 so that the annular peripheries of the spacers 13 abut the interior surface of the collector side wall 24. The emitters 12 are sized so that the tips 21 of the points are positioned a selected distance d from the collector side wall 24. The selected space distance d may be in a range between 1 mil and 40 mils. A spacing of 5 mils is preferred as this distance provides for efficient electron flow with minimal risk of damage as from sparking from unavoidable thermal instabilities such as thermal expansion of the emitters.

A liquid cooling jacket 33 is mounted to the heat tube 11 about the collector 23. The cooling jacket is sealed at one end about an entry end 35, of the heat tube 11 extending outwardly from a collector end wall 25 and sealed at an opposite end to an exhaust end 36 of the heat tube extending outwardly from the other collector end wall 25. The cooling jacket 33 has a liquid intake pipe 38 and a liquid discharge pipe 39 coupled to a liquid pump P which circulates a cooling liquid 40 such as water through the cooling jacket and an unshown heat exchanger.

A liquid reservoir, shown schematically at 42, is provided in fluid communication with the interior space of the collector 23 by means of a tube 43 which extends through the cooling jacket 33 and is sealed to the collector side wall 24. A supply of liquid cesium 44 is contained within the reservoir 42 which may be vaporized upon heating so as to rise into the collector once air is conventionally evacuated from the collector as by an unshown valve.

In FIG. 2, an electrical load 47 is shown coupled to the generator 10 by conductors 48 and 49. Conductor 48 electrically couples the load 47 to the collector 23 while conductor 49 electrically couples the load to the emitters 12 through metal tube 11 to complete the circuit.

A heat source, in the form of a gas burner 51, is mounted adjacent the heat tube entry end 35. The burner 51 may produce a flame 52 which extends into heat tube 11 so as to heat it and the emitters 12 mounted thereabout. Exhaust gases produced by the burning of the gas are expelled from the heat tube through its exhaust end 36.

In use, the gas burner 51 heats heat tube 11 and emitters 12 to between 1,700° K. and 2,100° K. Through heat convection between the emitters and collector, and heat conduction through the collector end walls 25, the collector side wall 24 is also heated. The circulating cooling liquid 40 within the cooling jacket 33 maintains the temperature of collector side wall between 800° K. and 1,200° K. Thus, a temperature difference between the emitters and the collector of between 500° K. and 1,300° K. is achieved. Preferably, the emitters are maintained at approximately 1,900° K. while the collector side wall is maintained at approximately 1,100° K. so as to achieve a preferred temperature differential of approximately 800° K. The electric power generated by the generator 10 is supplied to the load 47 via conductors 48 and 49.

The unique configuration of the star-shaped emitters 12 with their arrays of points 20 enhances the thermionic emission as compared with conventional cylindrical emitters. The configuration of the emitter points 20 reduces the effective work function of the surface by greatly enhancing the electric fields associated with charged particle emission from such structures, thereby increasing the electron emission from the emitters. In other words, the points intensify the thermionic emission of the emitters as compared with those of the prior art. The emitters may be rotatably oriented upon the heat tube 11 with their points longitudinally aligned or randomly offset from one another.

The elevated temperature of the emitters and collector causes cesium in reservoir 42 to vaporize into a plasma. The vaporized cesium passes through tube 43 into one end of the collector and then passes through the passages 17 of the spacers 13 between the emitter points so as to be present throughout the spatial interior of the collector. The presence of the vaporized cesium serves to limit the space charge produced by the emission of electrons from the emitter points.

As the temperature of the generator changes thermal instabilities may cause the collector to warp. As previously described, heretofore such warping has often caused system inefficiencies and even failures due to increases or decreases in the space distance between the elongated tubular collector and emitter. The possibility of warping now however is limited by the relatively thermally stable, ceramic spacers 13 mounted tightly between the heat tube 11 and the collector side wall 24. This close positioning of the spacers beside the several emitters inhibits relative movement of the emitters and collector between each other, thus substantially eliminating the possibility of an electric short occurrence caused by emitter contact with the collector or by sparking therebetween.

The circulation of the cooling liquid 40 through the cooling jacket 33 maintains the temperature of the collector at a lower temperature as compared with conventional thermionic generators. This also enables the seals 29 to be maintained at a comparatively lower temperature so that other materials such as rubber may also be used as an alternative to ceramic. By controlling the flow rate of the cooling liquid the temperature of the collector is regulated to obtain optimal performance. Additionally, the cooling jacket 33 is maintained at a lower temperature than the collector so as to reduce the effects of the generator upon the environment surrounding it.

Figure 5:
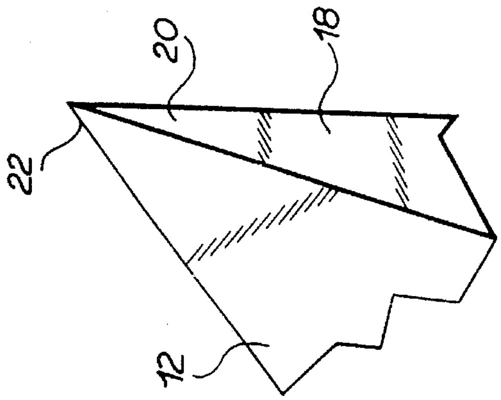
FIG. 5 is a perspective view of an alternative form of the emitter point.

It should be understood that any heat source capable of maintaining the temperature of the emitter within a working range may be used. Similarly, other space charge control enhancements can be employed such as addition of an electropositive species, such as barium, or an electronegative species, such as oxygen, to the low pressure cesium vapor. The number of emitter points may vary depending upon the working temperature, diameter and emitter material. The emitter points need not be uniformly spaced from each other. Also, their points may be tapered to form pointed tips 22 as shown in FIG. 5 or ridge shaped type as shown in FIG. 4. Though the spacers 13 may be mounted spaced from the emitters, preferably they are mounted flushly against the emitters, one on one, as a tight fit stack which facilitates assembly. The presence of spacers sandwiched tightly about the emitters produces an excellent maintenance in the spacing d between the tips of the emitter points and the common collector.

From the foregoing it is seen that a thermionic generator is now provided which overcomes problems long associated with those of the prior art. It should however be understood that the just described embodiments merely illustrate principles of the invention in its preferred form. Many modifications, additions and deletions may be made without departure from the spirit and scope of the invention as set forth in the following claims.

We claim:

1. A thermionic generator comprising a tubular collector, an emitter mounted within said tubular collector having a plurality of plates each having a plurality of points with tips located closely adjacent said tubular collector, a plurality of ceramic spacers mounted within said collector interspersed with said plurality of emitter plates, said emitter plates and spacers being mounted in a stack within said collector, means for heating said emitter sufficient to produce thermionic emission at said point tips, said heating means includes a heat tube mounted within said tubular collector and gas burner means mounted in position to produce a flame in said heat tube, said stack of emitters and spacers are mounted about said heat tube, and means for coupling an electric load with said emitter and collector.

2. A thermionic generator comprising a tubular collector, an emitter mounted within said tubular collector having a plurality of plates each having a plurality of points with tips located closely adjacent said tubular collector, a plurality of ceramic spacers mounted within said collector interspersed with said plurality of emitter plates, said emitter plates and spacers being mounted in a stack within said collector, means for heating said emitter sufficient to produce thermionic emission at said point tips, said heating means includes a heat tube mounted within said tubular collector, said stack of emitters and spacers are mounted about said heat tube, means for coupling an electric load with said emitter and collector, and a liquid coolant jacket mounted about said collector.

3. The thermionic generator of claim 2 further comprising means for introducing a space charge reducing plasma into said collector through said coolant jacket.

4. A thermionic generator comprising a heat tube, a tubular collector mounted coaxially about and electrically insulated from said heat tube, a plurality of generally star-shaped emitter plates mounted about said heat tube within said tubular collector, a plurality of electrically insulating spacers mounted about said heat tube in contact with said tubular collector, and a gas burner means mounted in position to produce a flame in said heat tube for heating said heat tube to elevate said star-shaped emitter plates sufficiently to produce thermionic emission.

5. The thermionic generator of claim 4 wherein said emitter plates each have a plurality of points with tips located closely adjacent said tubular collector.

6. The thermionic generator of claim 4 wherein said spacers are interspersed with said plurality of emitters.

7. The thermionic generator of claim 6 wherein said spacers and said emitters are positioned in an alternating sequence.

8. The thermionic generator of claim 6 wherein said emitters and spacers are mounted about said heat tube in a stack.

9. The thermionic generator of claim 4 further comprising a liquid coolant jacket mounted about said collector.

10. The thermionic generator of claim 9 further comprising means for introducing a space charge reducing plasma into said collector through said coolant jacket.

* * * * *